United States Patent
Lee et al.

(10) Patent No.: US 9,231,425 B2
(45) Date of Patent: Jan. 5, 2016

(54) BATTERY PACK SYSTEM OF IMPROVING OPERATING PERFORMANCE USING INTERNAL RESISTANCE OF CELL

(75) Inventors: JinKyu Lee, Busan (KR); Jin Seok Heo, Daejeon (KR); Min Chul Jang, Daejeon (KR); DalMo Kang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 698 days.

(21) Appl. No.: 13/405,472

(22) Filed: Feb. 27, 2012

(65) Prior Publication Data

US 2012/0176082 A1 Jul. 12, 2012

Related U.S. Application Data

(63) Continuation of application No. PCT/KR2011/000396, filed on Jan. 19, 2011.

(30) Foreign Application Priority Data

Jan. 28, 2010 (KR) .................. 10-2010-0008103

(51) Int. Cl.
| | |
|---|---|
| *H02J 7/00* | (2006.01) |
| *B60L 1/02* | (2006.01) |
| *B60L 3/00* | (2006.01) |
| *B60L 11/18* | (2006.01) |
| *H01M 10/42* | (2006.01) |
| *H01M 10/48* | (2006.01) |
| *H01M 16/00* | (2006.01) |
| *H01M 10/625* | (2014.01) |
| *H01M 10/615* | (2014.01) |

(Continued)

(52) U.S. Cl.
CPC ............... *H02J 7/0054* (2013.01); *B60L 1/02* (2013.01); *B60L 3/0046* (2013.01);

(Continued)

(58) Field of Classification Search
CPC .............................. H02J 7/0054; H02J 7/0057
USPC .......................................... 320/103–104, 129
See application file for complete search history.

(56) References Cited

U.S. PATENT DOCUMENTS

| 6,043,630 A * | 3/2000 | Koenck et al. ................ 320/128 |
| 6,321,707 B1 * | 11/2001 | Dunn ........................ 123/179.3 |

(Continued)

FOREIGN PATENT DOCUMENTS

| CN | 101496252 A | 7/2009 |
| JP | 2002-125326 A | 4/2002 |

(Continued)

OTHER PUBLICATIONS

JP 2005332777 A—Machine Translation; Ono, Mikio.*

(Continued)

*Primary Examiner* — Richard Isla Rodas
*Assistant Examiner* — David V Henze-Gongola
(74) *Attorney, Agent, or Firm* — Birch, Stewart, Kolasch & Birch, LLP

(57) ABSTRACT

Disclosed is a battery pack system to supply current necessary to operate an external device, including a battery module including battery cells which can be charged and discharged, a temperature sensor, an auxiliary power unit to supply a charge and discharge pulse current to the battery module, and a controller to connect the auxiliary power unit to the battery module so that the charge and discharge pulse current is supplied to the battery module when a measured temperature ($T_{bat}$) of the battery module is less than a set temperature ($T_{crit}$) based on information detected by the temperature sensor before the battery module is electrically connected to the external device and to interrupt the supply of the charge and discharge pulse current to the battery module when the temperature of the battery module becomes equal to or greater than the set temperature ($T_{crit}$) and an operating method of the same.

15 Claims, 5 Drawing Sheets

(51) Int. Cl.
*H01M 10/637* (2014.01)
*H01M 10/647* (2014.01)

(52) U.S. Cl.
CPC ........ *B60L 11/1868* (2013.01); *B60L 11/1872* (2013.01); *B60L 11/1875* (2013.01); *H01M 10/425* (2013.01); *H01M 10/4264* (2013.01); *H01M 10/486* (2013.01); *H01M 10/615* (2015.04); *H01M 10/625* (2015.04); *H01M 10/637* (2015.04); *H01M 10/647* (2015.04); *H01M 16/003* (2013.01); *H01M 16/006* (2013.01); *H02J 7/0057* (2013.01); *B60L 2210/12* (2013.01); *B60L 2210/14* (2013.01); *B60L 2240/545* (2013.01); *B60L 2240/662* (2013.01); *Y02T 10/7005* (2013.01); *Y02T 10/7066* (2013.01); *Y02T 10/7225* (2013.01); *Y02T 10/7233* (2013.01); *Y02T 10/7291* (2013.01); *Y02T 90/16* (2013.01)

(56) References Cited

U.S. PATENT DOCUMENTS

| | | | | |
|---|---|---|---|---|
| 6,340,879 | B1* | 1/2002 | Blacker | 320/153 |
| 8,452,490 | B2* | 5/2013 | Lakirovich et al. | 701/36 |
| 2002/0070710 | A1 | 6/2002 | Yagi et al. | |
| 2009/0096423 | A1 | 4/2009 | Aswani et al. | |
| 2009/0200987 | A1* | 8/2009 | Saito et al. | 320/134 |
| 2009/0315396 | A1 | 12/2009 | Ichikawa et al. | |
| 2009/0315403 | A1* | 12/2009 | Ichikawa et al. | 307/82 |

FOREIGN PATENT DOCUMENTS

| | | | |
|---|---|---|---|
| JP | 2005332777 A | * | 12/2005 |
| JP | 2006-54189 A | | 2/2006 |
| JP | 2006-092901 A | | 4/2006 |
| JP | 2008-29171 A | | 2/2008 |
| JP | 2009-100649 A | | 5/2009 |
| JP | 2009-140771 A | | 6/2009 |
| JP | 2010-11619 A | | 1/2010 |
| JP | 2010-11708 A | | 1/2010 |
| KR | 10-2007-0112489 A | | 11/2007 |
| KR | 10-2007-0112490 A | | 11/2007 |
| KR | 10-2009-0012479 A | | 2/2009 |

OTHER PUBLICATIONS

International Search Report issued in PCT/KR2011/000396 mailed Sep. 7, 2011.
Chinese Office Communication for corresponding Chinese Application No. 201180007680.4 dated Jan. 29, 2015 (with English translation).

* cited by examiner

BATTERY PACK SYSTEM OF IMPROVING OPERATING PERFORMANCE USING INTERNAL RESISTANCE OF CELL

TECHNICAL FIELD

The present invention relates to a battery pack system with improved operating performance using internal resistance of a cell, and, more particularly, to a battery pack system to supply current necessary to operate an external device, the battery pack system including a battery module including a plurality of battery cells which can be charged and discharged, the battery module to supply power to the external device, a temperature sensor to detect the temperature of the battery module, an auxiliary power unit to supply a charge and discharge pulse current to the battery module, and a controller to connect the auxiliary power unit to the battery module so that the charge and discharge pulse current is supplied to the battery module when a measured temperature ($T_{bat}$) of the battery module is less than a set temperature ($T_{crit}$) based on information detected by the temperature sensor before the battery module is electrically connected to the external device and to interrupt the supply of the charge and discharge pulse current to the battery module when the temperature of the battery module becomes equal to or greater than the set temperature ($T_{crit}$) and an operating method of the same.

BACKGROUND ART

Secondary batteries have attracted considerable attention as energy sources for wireless mobile devices. In addition, secondary batteries have attracted considerable attention as power sources for electric vehicles (EV), hybrid electric vehicles (HEV), and plug-in hybrid electric vehicles (Plug-in HEY), which have been developed to solve problems, such as air pollution, caused by existing gasoline and diesel vehicles using fossil fuels.

Such electric vehicles, hybrid electric vehicles and plug-in hybrid electric vehicles are devices which must be operated under more harsh conditions than small-sized mobile devices. That is, it is necessary for electric vehicles, hybrid electric vehicles and plug-in hybrid electric vehicles to exhibit proper performance in summer, for example at high temperature, and in winter, for example at low temperature.

To obtain good high temperature performance, a secondary battery having high temperature safety has been manufactured or a method of forming a coolant channel in a battery module or a battery pack has been used.

At low temperature, on the other hand, the secondary battery exhibits lower efficiency than at high temperature because the internal resistance of the battery is high at low temperature. As a result, the capacity of the battery is restricted and the liftspan of the battery is reduced.

In order to solve the above problems, a method of improving the low temperature performance of a battery has been studied. In such a battery, however, the low temperature performance of the battery is improved but the capacity and the high temperature performance of the battery are deteriorated.

As another method of improving low temperature performance of the battery, a method of increasing the temperature of the battery using an additional heating apparatus (heater) may be considered. However, much time is taken due to high thermal capacity of the battery, and the capacity of the battery is reduced due to internal power consumption.

Consequently, there is a high necessity for a battery pack system that is capable of minimizing internal power consumption while exhibiting excellent performance at low temperature without change in battery performance.

DISCLOSURE

Technical Problem

Therefore, the present invention has been made to solve the above problems, and other technical problems that have yet to be resolved.

As a result of a variety of extensive and intensive studies and experiments on a middle or large-sized battery pack case, the inventors of the present application have found that, if an auxiliary power unit is connected to a battery module so that a charge and discharge pulse current is supplied to the battery module when a measured temperature ($T_{bat}$) of the battery module is less than a set temperature ($T_{crit}$) based on information detected by a temperature sensor before the battery module is electrically connected to an external device, large internal resistance of the battery module serves as a heating body to increase the temperature of the battery module. The present invention has been completed based on these findings.

Technical Solution

In accordance with one aspect of the present invention, the above and other objects can be accomplished by the provision of a battery pack system to supply current necessary to operate an external device, the battery pack system including a battery module including a plurality of battery cells which can be charged and discharged, the battery module to supply power to the external device, a temperature sensor to detect the temperature of the battery module, an auxiliary power unit to supply a charge and discharge pulse current to the battery module, and a controller to connect the auxiliary power unit to the battery module so that the charge and discharge pulse current is supplied to the battery module when a measured temperature ($T_{bat}$) of the battery module is less than a set temperature ($T_{crit}$) based on information detected by the temperature sensor before the battery module is electrically connected to the external device and to interrupt the supply of the charge and discharge pulse current to the battery module when the temperature of the battery module becomes equal to or greater than the set temperature ($T_{crit}$).

In the battery pack system according to the present invention, large internal resistance of the battery module is used as a kind of heating body to increase the temperature of the battery module at a set temperature, such as low temperature, due to the charge and discharge pulse current from the auxiliary power unit. Consequently, it is possible to rapidly increase the temperature of the battery module within a short time irrespective of the thermal capacity of the battery unlike the conventional art at which an additional heating apparatus is used. Also, the capacity of the battery due to internal power consumption is not reduced. That is, the operating efficiency of the battery module is greatly improved.

The battery pack system particularly constructed as described above is preferably applicable to a case in which it is necessary to rapidly increase the temperature of the battery pack within a short time as needed so that the operating efficiency of the battery pack is maximized as well as a case in which it is necessary to increase the temperature of the battery module when the temperature of the battery module is low due to external environmental factors so that the battery module can reach a properly operating state.

The kind of each of the battery cells constituting the battery module is not particularly restricted so long as each of the battery cells is a secondary battery which can be charged and discharged. For example, each of the battery cells may be a prismatic battery cell, a cylindrical battery cell or a plate-shaped battery cell.

Generally, it is necessary for a battery pack to have high power output and large capacity so as to be used as a power source for middle or large-sized devices. To this end, a plurality of small-sized secondary batteries (unit cells) is connected in series and/or in parallel to each other to constitute a battery module, and a plurality of battery modules is connected in series and/or in parallel to each other to constitute a battery pack. For high integration, therefore, each of the battery cells is preferably a plate-shaped secondary battery.

The structure of and material for the plate-shaped battery cell are not particularly restricted. For example, the plate-shaped battery cell may be a pouch-shaped battery cell having a structure in which an electrode assembly having a cathode/separator/anode structure is mounted in a battery case formed of a laminate sheet comprising a resin layer and a metal layer.

For reference, the term 'battery module' as used in the specification includes the structure of a battery system configured to have a structure in which two or more chargeable and dischargeable battery cells or unit modules are mechanically coupled and, at the same time, electrically connected to each other so as to provide high-power, large-capacity electricity. Therefore, the battery module itself may constitute a single apparatus or a part of the large-sized apparatus. For example, a plurality of small-sized battery modules may be connected to each other to constitute a large-sized battery module. Alternatively, a small number of battery cells may be connected to each other to constitute a unit module, and a plurality of the unit modules may be connected to each other.

Meanwhile, the unit module may be configured to have various structures, a preferred example of which will be described hereinafter.

The unit module is configured to have a structure in which a plurality of plate-shaped battery cells, each of which has electrode terminals formed at the upper and lower ends thereof, are connected in series to each other. Specifically, the unit module may include two or more battery cells arranged in a stacked structure in which connection parts between the electrode terminals of the battery cells are bent and high-strength cell covers coupled to each other to cover the exteriors of the battery cells excluding the electrode terminals of the battery cells.

Two or more battery cells are covered by the high-strength cell covers which are made of synthetic resin or metal to constitute a unit module. The high-strength cell covers protect the battery cells, which have low mechanical strength, and, in addition, restrain the change in repetitive expansion and contraction during charge and discharge of the battery cells, thereby preventing sealing portions of the battery cells from being separated from each other. Consequently, it is possible to manufacture a battery module assembly exhibiting better safety.

The battery cells are connected in series and/or parallel to each other in one unit module, or the battery cells of one unit module are connected in series and/or parallel to the battery cells of another unit module. In a preferred example, a plurality of unit modules may be manufactured by coupling electrode terminals of the battery cells to each other, while arranging the battery cells in series in the longitudinal direction, so that the electrode terminals of the battery cells are successively adjacent to each other, bending the battery cells by twos or more so that the battery cells are stacked, and covering the stacked battery cells by predetermined numbers with the cell covers.

Coupling between the electrode terminals may be achieved in various ways, such as welding, soldering, and mechanical coupling. Preferably, coupling between the electrode terminals is achieved by welding.

A plurality of battery cells or unit modules, which is stacked in high integration while electrode terminals of the battery cells or the unit modules are connected to each other, may be vertically mounted in separable upper and lower cases that are configured to be coupled to each other in the assembly-type coupling structure to constitute a rectangular battery module.

The details of a unit module and a rectangular battery module manufactured using a plurality of unit modules are disclosed in Korean Patent Application No. 2006-45443 and No. 2006-45444, which have been filed in the name of the applicant of the present application and the disclosure of which is incorporated herein by reference.

The connection between the battery module and the device may be achieved in various manners. For example, a switch may be located at the electrical connection region between the battery module and the device so that the switch can be turned on or off according to a signal from the controller, to which, however, the present invention is not limited.

In the battery pack system according to the present invention, the temperature of the battery module detected by the temperature sensor may vary according to setting conditions. For example, the temperatures of some or all of the battery cells may be measured, and the highest temperature and the lowest temperature may be set as the measured temperature ($T_{bat}$), the average of the measured temperatures may be set as the measured temperature ($T_{bat}$), or the temperature of the battery cell(s) located at a specific position may be set as the measured temperature ($T_{bat}$). The measured temperature ($T_{bat}$) is important information necessary for the controller to perform a series of procedures.

Generally, the internal resistance of a secondary battery increases as the temperature of the secondary battery decreases. Referring to FIG. 1, the internal resistance of the secondary battery at a temperature of −10° C. is 4 times the internal resistance of the secondary battery at a temperature of 25° C. It is possible to raise the temperature of the secondary battery at low temperature with high efficiency ($I^2 *R$) using the internal resistance of the secondary battery. If power is consumed during raising of the temperature of the secondary battery based on the internal resistance thereof, however, the discharge of the battery module to drive the external device may be accelerated.

On the other hand, the battery pack system according to the present invention includes the auxiliary power unit to supply the charge and discharge pulse current to the battery module. Consequently, it is possible to rapidly raise the temperature of the battery module to a proper temperature while minimizing power consumption in the battery module by virtue of the charge and discharge pulse current between the battery module and the auxiliary power unit.

That is, charge and discharge between the battery module and the auxiliary power unit are continued to minimize power consumed through power circulation and to raise the temperature of the battery module using heat generation due to the internal resistance during the charge and discharge operation.

If the low temperature efficiency of the battery pack system is improved as described above, an attempt may not be necessary to chemically change a cathode, an anode and an electrolyte of the existing battery, thereby improving the low temperature efficiency of the battery pack system. Specifically, a method of chemically changing the battery to improve the low temperature efficiency is not preferable in terms of the high temperature performance, the capacity or the electrical efficiency. In the battery pack system according to the present invention, on the other hand, it is possible to use a battery having advantages in terms of the high temperature performance, the capacity or the electrical efficiency, thereby providing a battery module having higher performance than the conventional battery module.

The kind of the auxiliary power unit of the battery pack system is not particularly restricted so long as the auxiliary power unit is connected to the battery module to supply the charge and discharge pulse current to the battery module. In a preferred example, the auxiliary power unit may be a low-capacity auxiliary battery or a capacitor.

In a case in which a low-capacity auxiliary battery is used as the auxiliary power unit, the capacity of the auxiliary battery is preferably 3 to 15% that of the battery module. If the capacity of the auxiliary battery is greater than 15% that of the battery module, the size of the battery pack system relative to the power of the battery module supplied to the external device increases with the result that efficiency of the battery pack system is lowered. On the other hand, if the capacity of the auxiliary battery is less than 3% that of the battery module, the operating time of the auxiliary power unit to raise the temperature of the battery module increases, which is not preferable. More preferably, the capacity of the auxiliary battery is 4 to 12% that of the battery module.

The auxiliary power unit may be charged in various ways. For example, the auxiliary power unit may be charged by the battery module in a state in which the battery module is or is not electrically connected to the external device or may be charged by an additional power supply unit (for example, a battery to operate electronic components) of the external device, to which, however, the present invention is not limited.

In consideration of the relationship between the temperature and the internal resistance shown in FIG. 1, the set temperature ($T_{crit}$) to operate the auxiliary power unit may be set to a temperature range of −5° C. to 10° C. based on properties of the unit cell. Preferably, the set temperature ($T_{crit}$) is set to a temperature range of −2° C. to 10° C.

On the other hand, when the temperature of the battery pack is rapidly raised within a short time as needed even at a temperature at which the operation of the battery pack is properly performed so as to maximize the operation efficiency of the battery pack, the set temperature ($T_{crit}$) may be higher than the temperature at which the operation of the battery pack is properly performed. For example, the set temperature ($T_{crit}$) may be 5° C. to 20° C. higher than a temperature of 15° C. to 40° C. at which the operation is properly performed.

Consequently, the set temperature ($T_{crit}$) may be changed according to the purpose of temperature raising. According to circumstances, the system may be set so as to include two or more set temperatures.

Meanwhile, in the battery pack system, the charge and discharge pulse current is preferably a pulse wave current having the same charge and discharge rate. In order to raise the temperature of the battery module while minimizing power consumption of the battery module, the charge and discharge rates of the charge and discharge pulse current must be the same. In this state, loss of power in the battery module due to power circulation is minimized.

In this case, the pulse wave current may be, for example, a square wave type pulse wave current or a sine wave type pulse wave current. In the pulse wave current, a (+) integral value and a (−) integral value at each waveform becomes charge and discharge rates, and therefore, the charge and discharge rates are the same.

The size and supply time of the charge and discharge pulse current may be changed depending upon the capacity of the battery module, the capacity of the auxiliary power source, the difference between the measured temperature ($T_{bat}$) and the set temperature ($T_{crit}$) or the like. In a preferred example, the charge and discharge pulse current may be supplied at a ⅓ C-rate to 5 C-rate of each battery cell constituting the battery module for 2 to 30 seconds. Experiments performed by the inventors reveal that, in an exemplary battery pack system, time taken to reach 10° C. from −30° C. varies according to C-rate conditions.

In the battery pack system, the controller serves to control the operations of the respective components constituting the battery pack system. For example, the controller may control pulse current in consideration of the measured temperature and upper-limit C-rate at low temperature.

The application of the controller to the battery pack system is not particularly restricted. For example, the controller may be an independent apparatus or may be mounted in a battery management system (BMS).

In a preferred example, the battery pack system may further include a bidirectional converter disposed between the battery module and the auxiliary power unit to supply the charge and discharge pulse current.

According to an operating signal from the controller, the bidirectional converter may supply the charge and discharge pulse current from the auxiliary power unit to the battery module or charge the auxiliary power unit with current of the battery module.

In accordance with another aspect of the present invention, there is provided a device including the battery pack system as a power source.

The device may be a power tool, which is operated with power from an electric motor, an electric automobile, such as an electric vehicle (EV), a hybrid electric vehicle (REV) or a plug-in hybrid electric vehicle (PHEV), an electric two-wheeled vehicle, such as an electric bicycle (E-bike) or an electric scooter (E-scooter), or an electric golf cart, to which, however, the present invention is not limited.

Preferably, the device is an electric automobile, an electric two-wheeled vehicle or an electric golf cart, the performance of which is required to be maintained at low temperature and/or temperature of which is regulated as needed so as to maximize the operating efficiency thereof. More preferably, the device is an electric vehicle, a hybrid electric vehicle or a plug-in hybrid electric vehicle.

In accordance with a further aspect of the present invention, therefore, there is provided an operating method of the battery pack system as described below.

Specifically, the operating method of the battery pack system includes (a) measuring the temperature of the battery module before the battery module is electrically connected to the external device, (b) connecting the auxiliary power unit to the battery module so that the charge and discharge pulse current is supplied to the battery module when the measured temperature ($T_{bat}$) of the battery module is less than the set temperature ($T_{crit}$), (c) increasing the temperature of the battery module according to the supply of the charge and discharge pulse current to the battery module, (d) interrupting the supply of the charge and discharge pulse current to the battery module when the temperature of the battery module is equal to or greater than the set temperature ($T_{crit}$), and (e) electrically connecting the battery module to the external device.

According to circumstances, the operating method may further include charging the auxiliary power unit before step (a) or step (b) or after step (e). As previously described, the auxiliary power unit may be charged by the battery module in a state in which the battery module is electrically connected to the external device or is not electrically connected to the external device or may be charged by an additional power supply unit (for example, a battery to operate electronic components) of the external device.

When the auxiliary power unit is charged using the battery to operate electronic components, it is possible to reduce damage to the battery module, the performance of which is lowered at low temperature, and to charge the auxiliary power unit even when the battery module is not sufficiently charged.

The operating method of the battery pack system according to the present invention may be performed immediately before the battery module is connected to the external device to increase the temperature of the battery module to a range of the set temperature ($T_{crit}$) within a short time or while the temperature of the battery module continues to be monitored, in a state in which the external device is stopped (OFF), to maintain the temperature of the battery module at the set temperature ($T_{crit}$) or more. In the latter case, it is possible to maintain the temperature of the battery module within a usable range through charge and discharge within a short time, thereby reducing wait time before the device can operate.

BRIEF DESCRIPTION OF THE DRAWINGS

The above and other objects, features and other advantages of the present invention will be more clearly understood from the following detailed description taken in conjunction with the accompanying drawings, in which.

BEST MODE

Now, preferred embodiments of the present invention will be described in detail with reference to the accompanying drawings. It should be noted, however, that the scope of the present invention is not limited by the illustrated embodiments.

Figure 1:
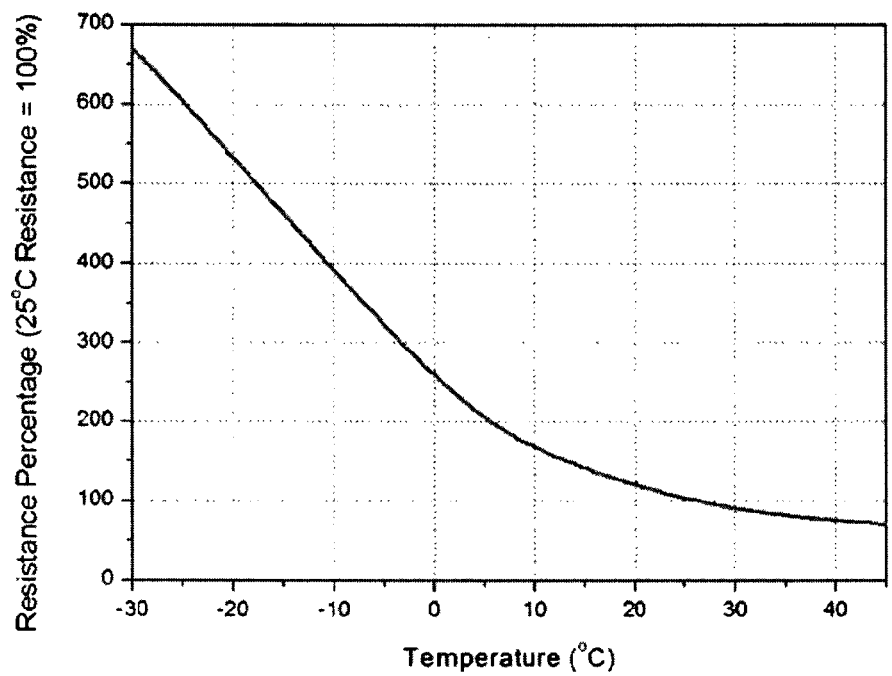
FIG. 1 is a graph illustrating the change in internal resistance of a secondary battery according to temperature.

FIG. 1 is a graph illustrating the change in internal resistance of a secondary battery according to temperature.

Referring to FIG. 1, the relative change in internal resistance of a secondary battery according to temperature is shown based on the internal resistance of the secondary battery at a temperature of 25° C. As the temperature falls, the internal resistance gently increases. The internal resistance at a temperature of 10° C. is more than 1.5 times the internal resistance at a temperature of 25° C. Subsequently, the internal resistance sharply increases. The internal resistance at a temperature of 0° C. is 2.5 times the internal resistance at a temperature of 25° C. The internal resistance at a temperature of −10° C. is 4 times the internal resistance at a temperature of 25° C.

Work with respect to the internal resistance of the battery becomes thermal energy generated during charge and discharge of the battery. That is, $W=VI=I^2R$. Thermal energy W is proportional to internal resistance R. When the internal resistance increases at low temperature, therefore, thermal energy also increases.

Figure 2:
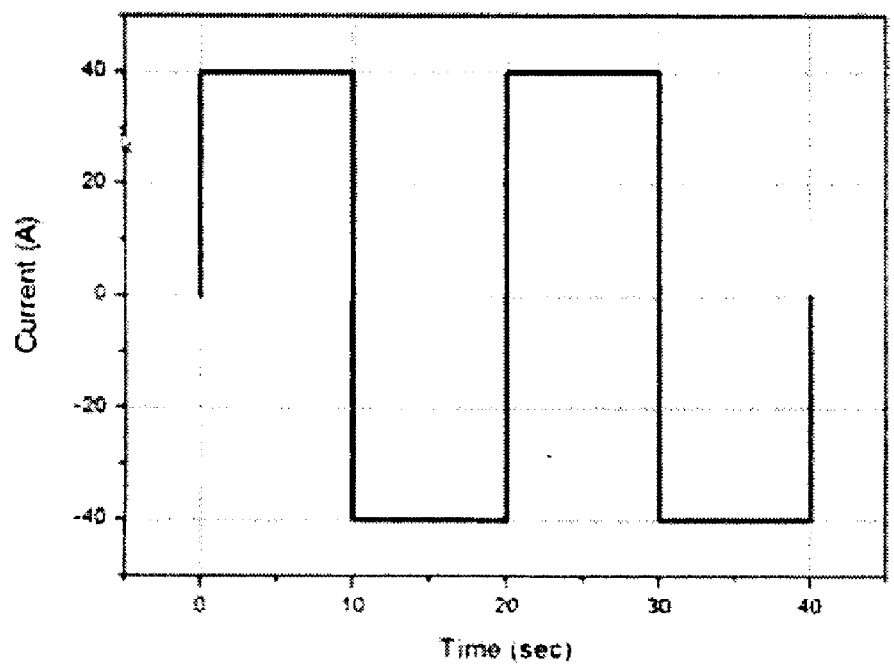
FIG. 2 is a graph illustrating the form of a square wave type pulse wave having the same charge and discharge rate.
Figure 3:
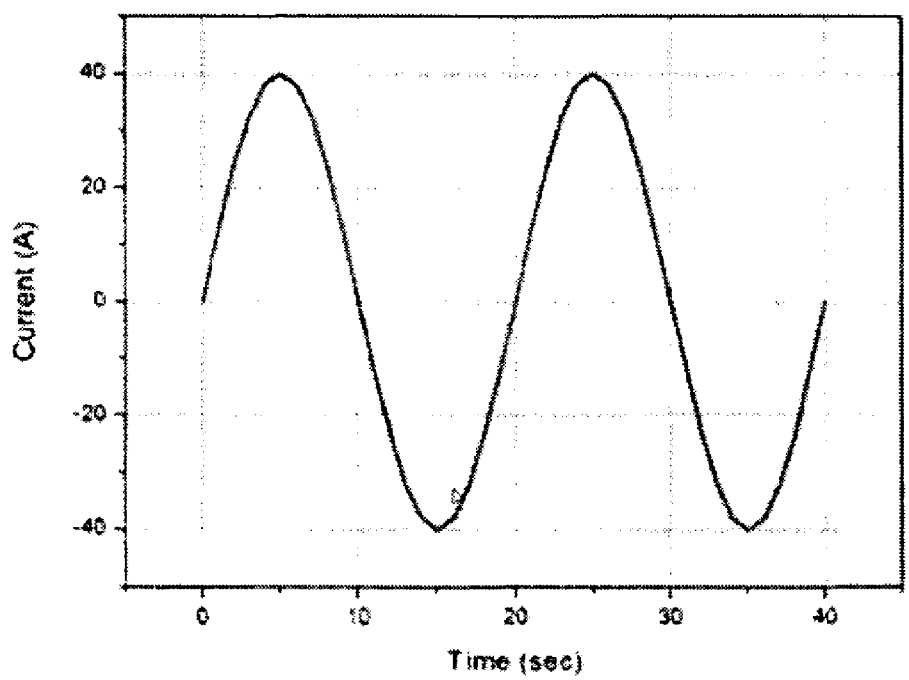
FIG. 3 is a graph illustrating the form of a sine wave type pulse wave having the same charge and discharge rate.

FIGS. 2 and 3 are graphs illustrating forms of a pulse wave having the same charge and discharge rate usable in the battery pack system according to the present invention.

Referring to these drawings, integral values with respect to time in each graph becomes charge and discharge capacities. When (+)/(−) integral values are the same, therefore, the charge and discharge capacities are the same, thereby minimizing internal power consumption of a battery module.

Figure 4:
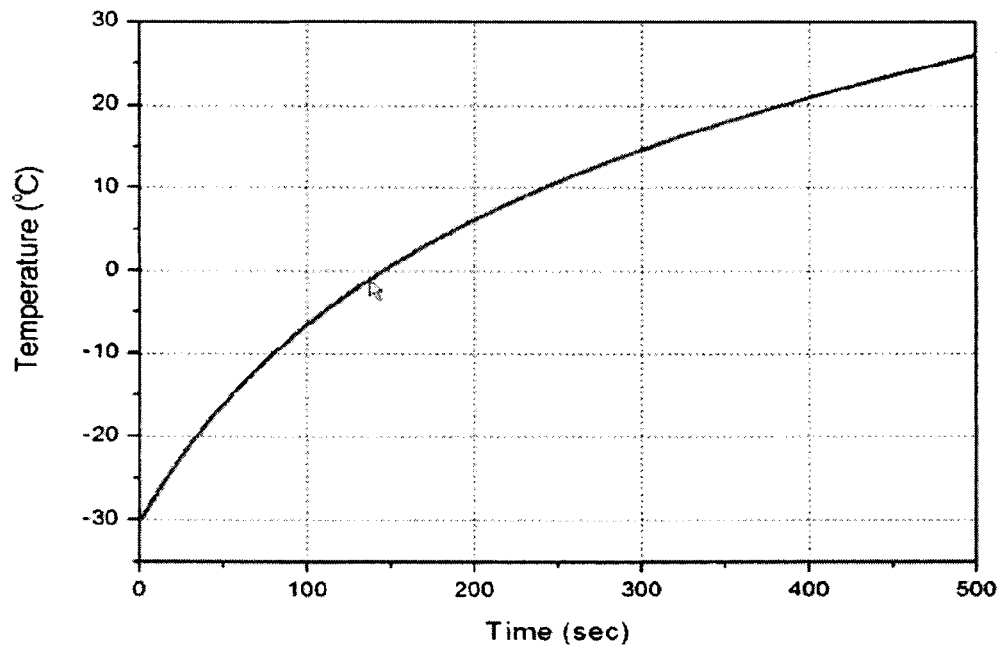
FIG. 4 is a graph illustrating a temperature rise curve of a battery when a battery pack system according to an embodiment of the present invention is applied.

FIG. 4 is a graph illustrating a temperature rise curve of a battery when a battery pack system according to an embodiment of the present invention is applied.

Referring to FIG. 4, it can be seen that the inclination of the graph becomes gentler with the progress of time. This is because internal resistance decreases as temperature increases, as previously described, and therefore, thermal energy decreases in proportion to the internal resistance.

Also, it can be seen that it takes approximately 250 seconds to increase the temperature of the battery from −30° C. to 10° C. When the battery is heated using an external heat supply unit, it is difficult to achieve such a rapid increase in temperature within a short time due to high thermal capacity of the battery.

According to circumstances, if the battery module is configured so that the temperature of the battery module remains within a predetermined range through charge and discharge of the battery when the temperature of the battery module continues to be monitored, in a state in which a device is stopped, and a measured temperature $T_{bat}$ is less than a set temperature $T_{crit}$, the operating time of the battery pack system may be very short, for example several seconds to several tens of seconds.

Figure 5:
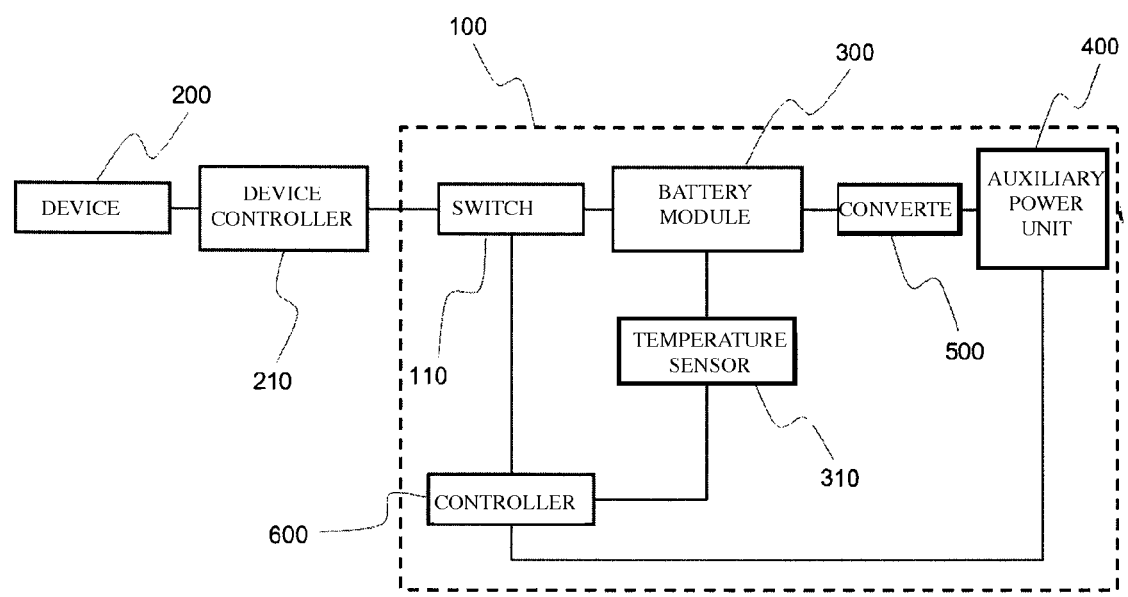
FIG. 5 is a typical construction view of a battery pack system according to an embodiment of the present invention.

FIG. 5 is a typical construction view of a battery pack system according to an embodiment of the present invention.

Referring to FIG. 5, a battery pack system 100 according to an embodiment of the present invention includes a battery module 300 to supply power to an external device 200, a temperature sensor 310 to measure temperature of the battery module, an auxiliary power unit 400 to supply a charge and discharge pulse wave current, a bidirectional converter 500 connected between the battery module 300 and the auxiliary power unit 400, and a controller 600 to control the above components.

The battery module 300 is connected to or disconnected from a device controller 210 by ON/OFF operation of a switch 110 to perform electrical switching between the battery module 300 and the device 200 according to a signal from the controller 600.

In a state in which the switch 110 is OFF, the temperature of the battery module is measured by the temperature sensor 310, and the controller 600 compares the measured temperature $T_{bat}$ with the set temperature $T_{crit}$.

When the measured temperature $T_{bat}$ is less than the set temperature $T_{crit}$ as the result of the temperature comparison, the controller 600 connects the auxiliary power unit 400 to the battery module 300 so that a charge and discharge pulse wave current is supplied to the battery module 300 via the bidirectional converter 500 disposed between the battery module 300 and the auxiliary power unit 400. Upon the supply of the charge and discharge pulse wave current to the battery module 300, the temperature of the battery module 300 increases. As a result, when the temperature of the battery module 300 becomes equal to or greater than the set temperature $T_{crit}$, the controller 600 electrically disconnects the auxiliary power unit 400 from the battery module 300 and electrically connects the battery module 300 to the device 200 via the switch 110. Consequently, the temperature of the battery module 300 increases to at least the set temperature $T_{crit}$, before the battery module 300 is connected to the device 200, thereby maximizing the operating efficiency of the battery pack system.

According to circumstances, the above operation may be repeatedly performed so that the temperature of the battery module 300 is kept at the set temperature $T_{crit}$ even in a state in which the connection of the battery module 300 to the device is not considered, whereby the connection between the battery module 300 and the device 200 may be possible at all times.

Figure 6:
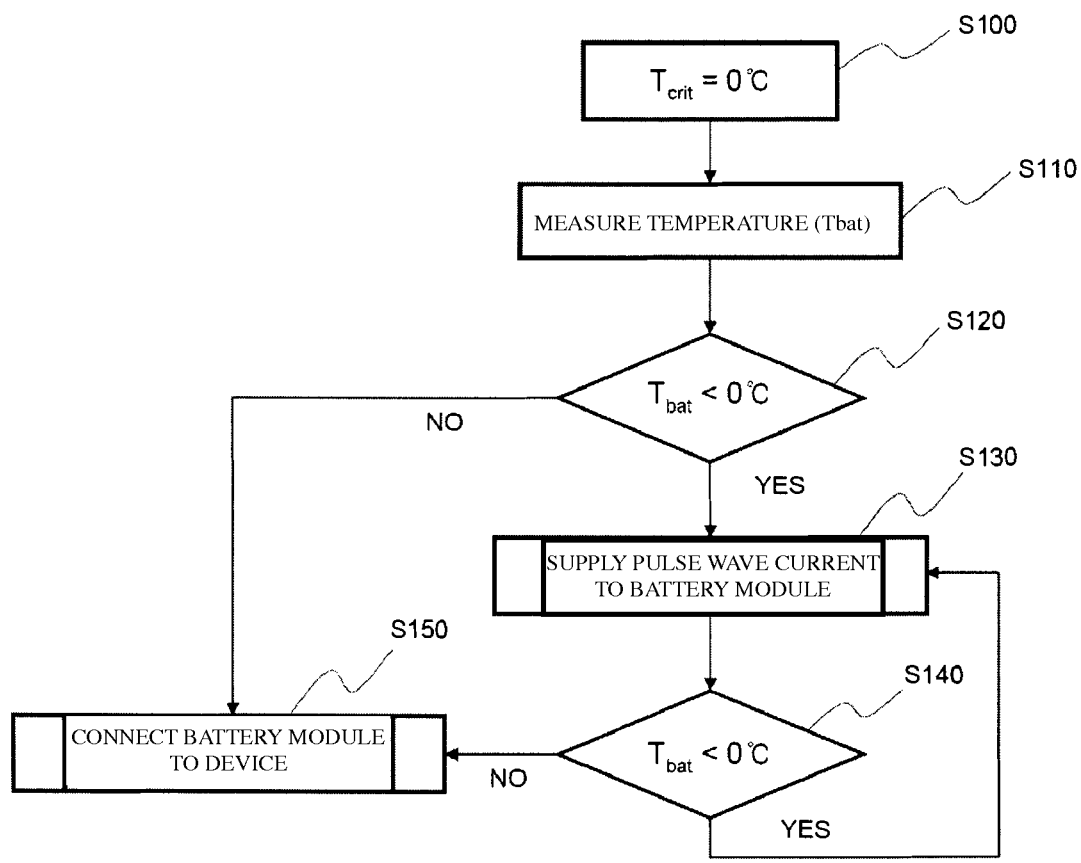
FIG. 6 is a flow chart illustrating a battery pack temperature control method of a battery pack system according to an embodiment of the present invention.

FIG. 6 is a flow chart illustrating a battery pack temperature control method of a battery pack system according to an embodiment of the present invention.

Referring to FIG. 6 together with FIG. 5, the controller 600 reads a set temperature $T_{crit}$ when the battery pack system 100 is operated (S100), and the temperature sensor 310 measures temperature $T_{bat}$ of the battery module 300 (S110). Subsequently, the controller 600 determines whether the measured temperature $T_{bat}$ is less than the set temperature $T_{crit}$ (S120). For example, the set temperature $T_{crit}$ may be 0° C.

When it is determined that the measured temperature $T_{bat}$ is less than the set temperature $T_{crit}$ (YES), the controller 600 connects the auxiliary power unit 400 to the battery module 300 via the bidirectional converter 500 so that a charge and discharge pulse wave current is supplied to the battery module 300 (S130). On the other hand, when it is determined that the measured temperature $T_{bat}$ is equal to or greater than the set temperature $T_{crit}$ (NO), the controller 600 connects the battery module 300 to the device 200 (S150).

At the step of supplying the charge and discharge pulse wave current (S130), the charge and discharge pulse wave current is supplied to the battery module, and it is determined whether the measured temperature $T_{bat}$ of the battery module 300 is less than the set temperature $T_{crit}$. When it is determined that the measured temperature $T_{bat}$ is less than the set temperature $T_{crit}$ (YES), the procedure returns to the step of supplying the charge and discharge pulse wave current (S130) so that the step of supplying the charge and discharge pulse wave current and the subsequent step are performed. When it is determined that the measured temperature $T_{bat}$ is equal to or greater than the set temperature $T_{crit}$ (NO), the procedure advances to the step of connecting the battery module 300 to the device 200 (S150).

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As is apparent from the above description, it is possible for the battery pack system according to the present invention and the operating method of the same to rapidly increase the temperature of the battery module to a usable range based on a heat generation phenomenon during charge and discharge of the battery due to high internal resistance at a set temperature while minimizing internal power consumption of the battery module using the auxiliary power unit to supply a pulse wave current to the battery module.

The invention claimed is:

1. A battery pack system to supply current necessary to operate an external device, the battery pack system comprising:
   a battery module comprising a plurality of battery cells which can be charged and discharged, the battery module to supply power to the external device;
   a temperature sensor to detect a temperature of the battery module;
   an auxiliary power unit to supply a charge and discharge pulse current to the battery module;
   an additional power supply unit;
   a controller to connect the auxiliary power unit to the battery module so that the charge and discharge pulse current is supplied to the battery module when a measured temperature (Tbat) of the battery module is less than a set temperature (Tcrit) based on information detected by the temperature sensor before the battery module is electrically connected to the external device and to interrupt the supply of the charge and discharge pulse current to the battery module when the temperature of the battery module becomes equal to or greater than the set temperature (Tcrit),
   wherein the auxiliary power unit is a low-capacity auxiliary battery, and a capacity of the auxiliary battery is 3 to 15% of a capacity of the battery module, and the auxiliary power unit is charged by the additional power supply unit; and
   a bidirectional converter electrically connected between the battery module and the auxiliary power unit to drive the charge and discharge pulse current.

2. The battery pack system according to claim 1, wherein each of the plurality of battery cells is a plate-shaped secondary battery.

3. The battery pack system according to claim 2, wherein each of the plate-shaped plurality of secondary batteries is formed to have a structure in which an electrode assembly having a cathode/separator/anode structure is mounted in a battery case formed of a laminate sheet comprising a resin layer and a metal layer.

4. The battery pack system according to claim 1, wherein the set temperature ($T_{crit}$) is set to a temperature range of −5° C. to 10° C.

5. The battery pack system according to claim 1, wherein the set temperature ($T_{crit}$) is set to a temperature range of 5° C. to 20° C. higher than a temperature of 15° C. to 40° C. at which operation is properly performed.

6. The battery pack system according to claim 1, wherein the charge and discharge pulse current is a pulse wave current having the same charge and discharge rate.

7. The battery pack system according to claim 6, wherein the pulse wave current is a square wave type pulse wave current or a sine wave type pulse wave current.

8. The battery pack system according to claim 1, wherein the charge and discharge pulse current is supplied at a ⅓ C-rate to 5 C-rate of each battery cell constituting the battery module for 2 to 30 seconds.

9. The battery pack system according to claim 1, wherein the controller is an independent apparatus or is mounted in a battery management system (BMS).

10. A device comprising the battery pack system according to claim 1 as a power source.

11. The device according to claim 10, wherein the device is an electric vehicle, a hybrid electric vehicle or a plug-in hybrid electric vehicle.

12. An operating method of the battery pack system according to claim 1, the operating method comprising:
   (a) measuring the temperature of the battery module before the battery module is electrically connected to the external device;
   (b) connecting the auxiliary power unit to the battery module so that the charge and discharge pulse current is supplied to the battery module when the measured temperature ($T_{bat}$) of the battery module is less than the set temperature ($T_{crit}$);
   (c) increasing the temperature of the battery module according to the supply of the charge and discharge pulse current to the battery module;
   (d) interrupting the supply of the charge and discharge pulse current to the battery module when the temperature of the battery module is equal to or greater than the set temperature ($T_{crit}$); and
   (e) electrically connecting the battery module to the external device.

13. The operating method according to claim 12, further comprising charging the auxiliary power unit before step (a) or step (b) or after step (e).

14. The operating method according to claim 12, wherein the above steps are performed immediately before the battery module is connected to the external device to increase the temperature of the battery module to a range of the set temperature ($T_{crit}$).

15. The operating method according to claim 12, wherein the above steps are repeatedly performed while the temperature of the battery module continues to be monitored, in a state in which the external device is stopped (OFF), to maintain the temperature of the battery module at the set temperature ($T_{crit}$) or more.

* * * * *